(12) United States Patent
Tan et al.

(10) Patent No.: US 12,175,100 B1
(45) Date of Patent: Dec. 24, 2024

(54) DATA PROCESSING IN MEMORY SYSTEM

(71) Applicant: Yangtze Memory Technologies Co., Ltd., Hubei (CN)

(72) Inventors: Hua Tan, Hubei (CN); Xing Wang, Hubei (CN); Yaolong Gao, Hubei (CN); Fanya Bi, Hubei (CN); Zhe Sun, Hubei (CN); Bo Yu, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/357,827

(22) Filed: Jul. 24, 2023

(30) Foreign Application Priority Data

Jun. 13, 2023 (CN) .......................... 202310706197.X (51) Int. Cl.
*G06F 3/06* (2006.01)
*G06F 11/00* (2006.01)

(52) U.S. Cl.
CPC .......... *G06F 3/0625* (2013.01); *G06F 3/0659* (2013.01); *G06F 3/0673* (2013.01); *G06F 11/00* (2013.01)

(58) Field of Classification Search
CPC .... G06F 3/0625; G06F 3/0659; G06F 3/0673; G06F 3/0619; G06F 11/00; G06F 11/10
USPC ................... 711/154; 714/6.1, 763, 799
See application file for complete search history.

(56) References Cited

U.S. PATENT DOCUMENTS

| | | | |
|---|---|---|---|
| 2014/0006884 A1* | 1/2014 | Haneda | G06F 11/006 714/701 |
| 2020/0117592 A1* | 4/2020 | Berger | G06F 12/0895 |
| 2020/0210259 A1* | 7/2020 | Hoei | G11C 16/3418 |
| 2022/0291837 A1* | 9/2022 | Shao | G06F 3/064 |
| 2024/0088916 A1* | 3/2024 | Kumar | H03M 13/1122 |

* cited by examiner

*Primary Examiner* — Than Nguyen
(74) *Attorney, Agent, or Firm* — Oblon, McClelland, Maier & Neustadt, L.L.P.

(57) ABSTRACT

A method for a memory system is disclosed. The memory system can include a memory controller and a memory device. The method can include receiving data that includes bits and is to be written into the memory device, counting a first bit number of the bits corresponding to a first state and a second bit number of the bits corresponding to the second state, and in response to the second bit number of the bits being larger than the first bit number of the bits, the flipping operation is performed.

20 Claims, 7 Drawing Sheets

DATA PROCESSING IN MEMORY SYSTEM

INCORPORATION BY REFERENCE

This present application claims the benefit of Chinese Patent Application No. 202310706197.X, filed on Jun. 15, 2023, which is incorporated herein by reference in its entirety.

TECHNICAL FIELD

The present application is related to data processing technologies in a memory system.

BACKGROUND

Storage class memory (SCM) can be employed as a new tier of memory/storage between dynamic random-access memory (DRAM) and NAND flash storage in a computer memory hierarchy. SCM offers fast non-volatile memory to the processor with a speed slightly below DRAM but significantly above that of NAND flash storage. SCM has a capacity at the scale of NAND flash drives and can be addressable at the byte granularity. Technologies such as phase change memory (PCM), resistive random-access memory (ReRAN), magnetic random-access memory (MRAM), carbon nanotube random-access memory, and the like, can be adopted in SCM.

SUMMARY

Aspects of the disclosure provide a method for a memory system. The memory system can include a memory controller and a memory device. The method can include receiving data that is to be written into the memory device, the memory device including memory cells, each memory cell having a first state and a second state, the data including bits each corresponding to one of the first state and the second state; counting a first bit number of the bits corresponding to the first state and a second bit number of the bits corresponding to the second state in the received data; determining whether to perform a first flipping operation to the received data based on the second bit number of the bits corresponding to the second state and the first bit number of the bits corresponding to the first state; in response to the second bit number of the bits corresponding to the second state being larger than the first bit number of the bits corresponding to the first state by a difference that is greater than a threshold, performing the first flipping operation to flip the bits in the received data; and storing the received data with the flipped bits to the memory device.

In an embodiment, the method can further include storing the received data to the memory device without flipping the bits in the received data in response to the second bit number of the bits corresponding to the second state being not larger than the first bit number of the bits corresponding to the first state, or the second bit number of the bits corresponding to the second state being larger than the first bit number of the bits corresponding to the first state by the difference that is smaller than the threshold.

In an embodiment, the method can further include generating a flipping flag indicating whether the first flipping operation has been performed to the received data; and storing the flipping flag to the memory device. In an example, the method can further include reading, from the memory device, the received data with the flipped bits and the flipping flag indicating whether the first flipping operation has been performed to the received data; determining whether to perform a second flipping operation to the received data with the flipped bits based on the flipping flag indicating whether the first flipping operation has been performed to the received data; and in response to the flipping flag indicating that the first flipping operation has been performed to the received data, performing the second flipping operation to flip the previously flipped bits in the received data.

In an example, the storing the received data with the flipped bits to the memory device includes encoding the received data with the flipped bits to generate error correction code (ECC) parity information; and storing the ECC parity information to the memory device. In an example, the reading, from the memory device, the received data with the flipped bits includes reading the ECC parity information from the memory device; and recovering the received data with the flipped bits based on the ECC parity information.

In an embodiment, the memory device is a phase change memory (PCM) device, and the first state and the second state of the memory cells of the memory device correspond to a crystalline state and an amorphous state, respectively, of the PCM device. In an embodiment, the memory device is one of resistive random-access memory, magnetic random-access memory, carbon nanotube random-access memory, and dynamic random-access memory.

Aspects of the disclosure further provide a memory system including a memory device, and a memory controller including circuitry. The circuitry can be configured to receive data that is to be written into the memory device at the memory controller, the memory device including memory cells, each memory cell having a first state and a second state, the data including bits each corresponding to one of the first state and the second state; count a first bit number of the bits corresponding to the first state and a second bit number of the bits corresponding to the second state in the received data; determine whether to perform a first flipping operation to the received data based on the second bit number of the bits corresponding to the second state and the first bit number of the bits corresponding to the first state; in response to the second bit number of the bits corresponding to the second state being larger than the first bit number of the bits corresponding to the first state by a difference that is greater than a threshold, perform the first flipping operation to flip the bits in the received data; and store the received data with the flipped bits to the memory device.

Aspects of the disclosure provide a non-transitory computer-readable medium storing instructions. The instructions, upon execution by a processing device, cause the processing device to perform the above method of the memory system.

BRIEF DESCRIPTION OF THE DRAWINGS

Aspects of the present disclosure can be understood from the following detailed description when read with the accompanying figures. It is noted that, in accordance with the standard practice in the industry, various features are not drawn to scale. In fact, the dimensions of the various features may be increased or reduced for clarity of discussion.

DETAILED DESCRIPTION OF EMBODIMENTS

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosure can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
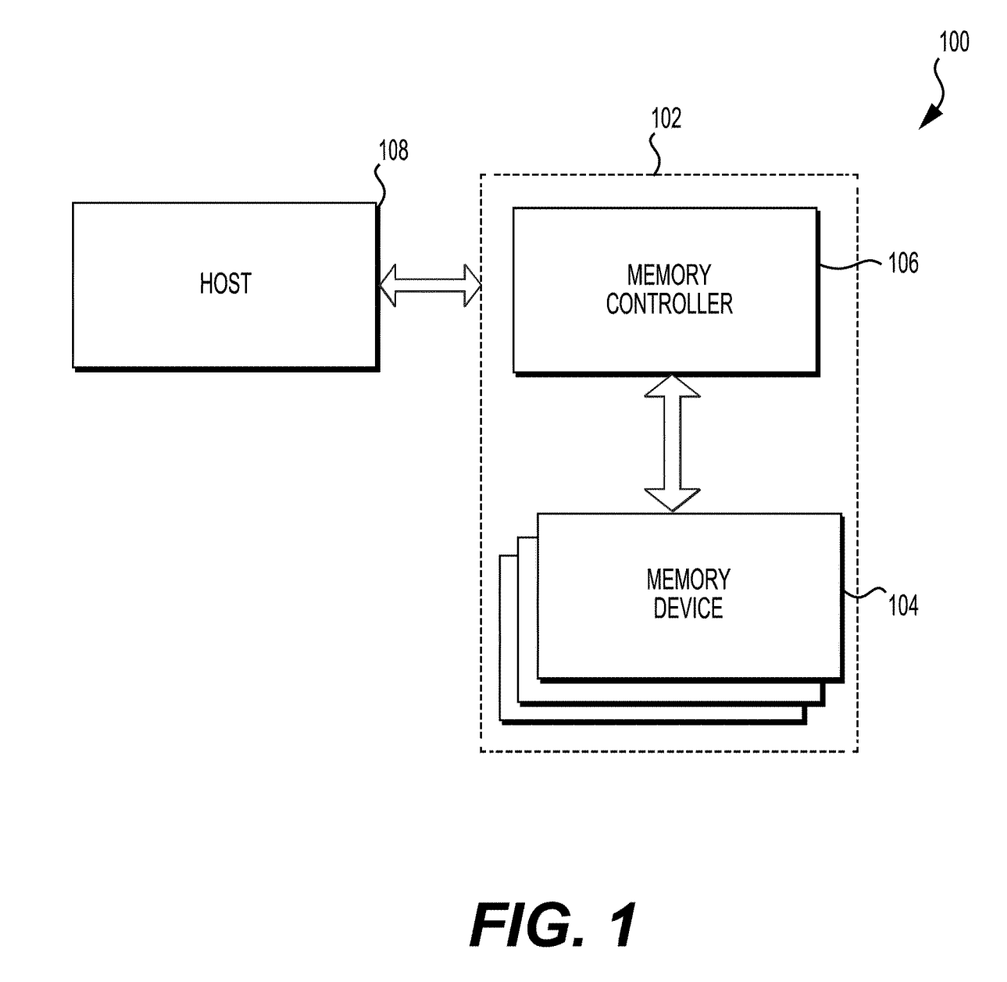
FIG. 1 illustrates a block diagram of a computer system 100 having memory devices, according to some aspects of the present disclosure.

FIG. 1 illustrates a block diagram of a computer system 100 having memory devices, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and a memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data to or from memory devices 104. Memory devices 104 can be any memory device disclosed in the present disclosure.

Memory controller 106 is coupled to memory devices 104 and host 108 and is configured to control memory devices 104, according to some embodiments. Memory controller 106 can manage the data stored in memory devices 104 and communicate with host 108. Memory controller 106 can be configured to control operations of memory devices 104, such as read, erase, and program operations (write operations). Memory controller 106 can also be configured to manage various functions with respect to the data stored or to be stored in memory devices 104 including, but not limited to bad-block management, garbage collection, logical-to-physical address conversion, wear leveling, etc. In some embodiments, memory controller 106 is further configured to process error correction codes (ECCs) with respect to the data read from or written to memory devices 104. Any other suitable functions may be performed by memory controller 106 as well.

Memory controller 106 can communicate with an external device (e.g., host 108) according to a particular communication protocol. For example, memory controller 106 may communicate with the external device through at least one of various interface protocols, such as a USB protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

In some embodiments, the memory system 102 does not include the memory controller 106, and the host 108 is coupled to the memory device 104 directly. The memory controller 106 may be located in the host 108. Alternatively, the host 108 may not include the memory controller 106 either but may be configured to perform functions similar to what the memory controller 106 does as described above or below.

In various embodiments, memory devices 104 can be based on various memory technologies. In some embodiments, memory devices 104 employ storage class memory (SCM) technologies. Examples of SCM technologies include phase change memory (PCM), resistive random-access memory (ReRAN), magnetic random-access memory (MRAM), carbon nanotube random-access memory, and the like.

PCM is based on phase change materials. Such materials can exist in two different phases: amorphous phase and crystalline phase. The amorphous phase has a higher resistivity than the crystalline phase. Thus, the two phases can represent two different memory states of a single-level cell (SLC). By suitable optical or electrical heating, the amorphous phase can be set to the crystalline phase, or the crystalline phase can be reset to the amorphous phase. In some examples, some phase change materials can be controlled to change among more than two states with different resistance levels. Multiple-level cells (MLC) can accordingly be implemented. Examples of the phase change materials can include GeSbTe (GST), N-doped GST, GaSbGe, GeBiTe, physical vapor deposition (PVD) GST, GeTe/SbTe, and the like. In some embodiments, phase-transforming chalcogenides are used for PCM.

ReRAM exploits the physical phenomena of resistive switching. For example, a dielectric object can experience a change of resistance across terminals of the dielectric object when subject to electric current or field. Switching from a high resistance state to a low resistance state is the set operation, while switching from a low resistance state to a high resistance state is the reset operation. In some examples, a cell of ReRAM, referred to as a memristor, can have a metal-insulator-metal structure.

MRAM can store data using magnetic charges. For example, a MRAM cell can include two magnetic elements stacked one over the other. One magnetic element has a fixed magnetic polarity, while the other has a switchable (programmable) polarity. Depending on the switchable polarity, the MRAM cell can exhibit parallel magnetic moments of the magnetic elements (with a low resistance) or antiparallel magnetic moments of the magnetic elements (with a high resistance). The electrical resistance of the cell can be measured by passing an electrical current through a write line to induce a magnetic field across the cell.

Carbon nanotube random-access memory is based on the position of carbon nanotubes deposited on a chip-like substrate. For example, in a two-terminal cell, crossed nanotubes between two electrodes can either be touching or slightly separated. The resistance of the nanotubes in contact is low, while the resistance of nanotubes separated is high. A suitable voltage can be applied to two terminals to switch the cell between the low- and high-resistance states.

Memory devices 104 can include one or more memory cell arrays. In some embodiments, memory cells of the memory cell arrays can be SLCs that each have two possible memory states and, thus, can store one bit of data. For example, the first memory state "0" can correspond to a first range of resistances, and the second memory state "1" can correspond to a second range of resistances. In some embodiments, memory cells of the memory arrays can be MLCs that are capable of storing more than a single bit of data in more than two memory states. For example, the MLC can store two bits per cell (also known as a double-level cell (DLC)), three bits per cell (also known as triple-level cell (TLC)), or four bits per cell (also known as a quad-level cell (QLC)).

In some embodiments, memory devices 104 are dynamic random-access memory (DRAM). In an example, a memory cell of such DRAM can be made of a capacitor and a transistor. The capacitor can either be charged or discharged. These two states can represent two values of a bit, 0 and 1. Memory refresh circuits may be configured to periodically rewrite the data in the capacitors.

According to aspects of the disclosure, the memory controller 106 can be configured to perform data processing to convert data from an original form to a target form before writing the data to memory devices 104. Compared with the original form of the data, the garget form is more friendly to memory devices 104. For example, memory devices 104 employ PCM technologies. Memory cells in memory devices 104 use the amorphous phase to represent the binary digit (bit), 0, and the crystalline phase to represent the binary digit (bit), 1. Writing digits of 0s would involve more reset operations, while writing digits of 1s would involve more set operations. According to the disclosure, the reset operation applies a stronger current and a high temperature to the phase change materials in a memory cell, thus having a more negative impact on the endurance of the memory cells and also consuming more power, compared with the set operation. Accordingly, a digit sequence that is to be written into memory devices 104 is preferred to include more 1s than 0s.

To improve the memory cell endurance and save power, the memory controller 106 can be configured to investigate the numbers of 1s and 0s in a sequence of digits (or bits) in the data. When the number of 0-bits is greater than the number of 1-bits, in some embodiment, the memory controller 106 can employ an inverter to flip the bits in the sequence. For example, 0-bits become 1-bits, and 1-bits become 0-bits, as a result of the flipping or inverting operation. The resulting sequence would include more 1-bits than 0-bits. Writing such a sequence would incur fewer reset operations (that transform the crystalline phase to the amorphous phase) than writing the original sequence.

A flip flag can be generated and stored in memory devices 104 accompanying respective pieces of data. The flip flag can indicate whether a bit flipping operation has been applied to the respective data. When reading a piece of data, an associated flip flag can also be retrieved from memory devices 104. The memory controller 106 can determine whether to perform a reverse transform to the respective data based on a value of the flip flag to obtain the original data.

While the PCM is used in some examples for the explanation of the data conversion scheme, the inventive concept of the disclosure is not limited to any specific memory technologies. Various memory technologies may employ different materials, device structures, or operation principles, and the respective memory device may have different properties. Whenever a memory device exhibits a preference for a certain pattern of bits (0 or 1) (such as percentages of 0-bits and 1-bits) in the data, and the preference can be motivated by various possible reasons such as saving power, improving endurance, or any other reasons, the data conversion scheme disclosed herein can be employed.

Figure 2:
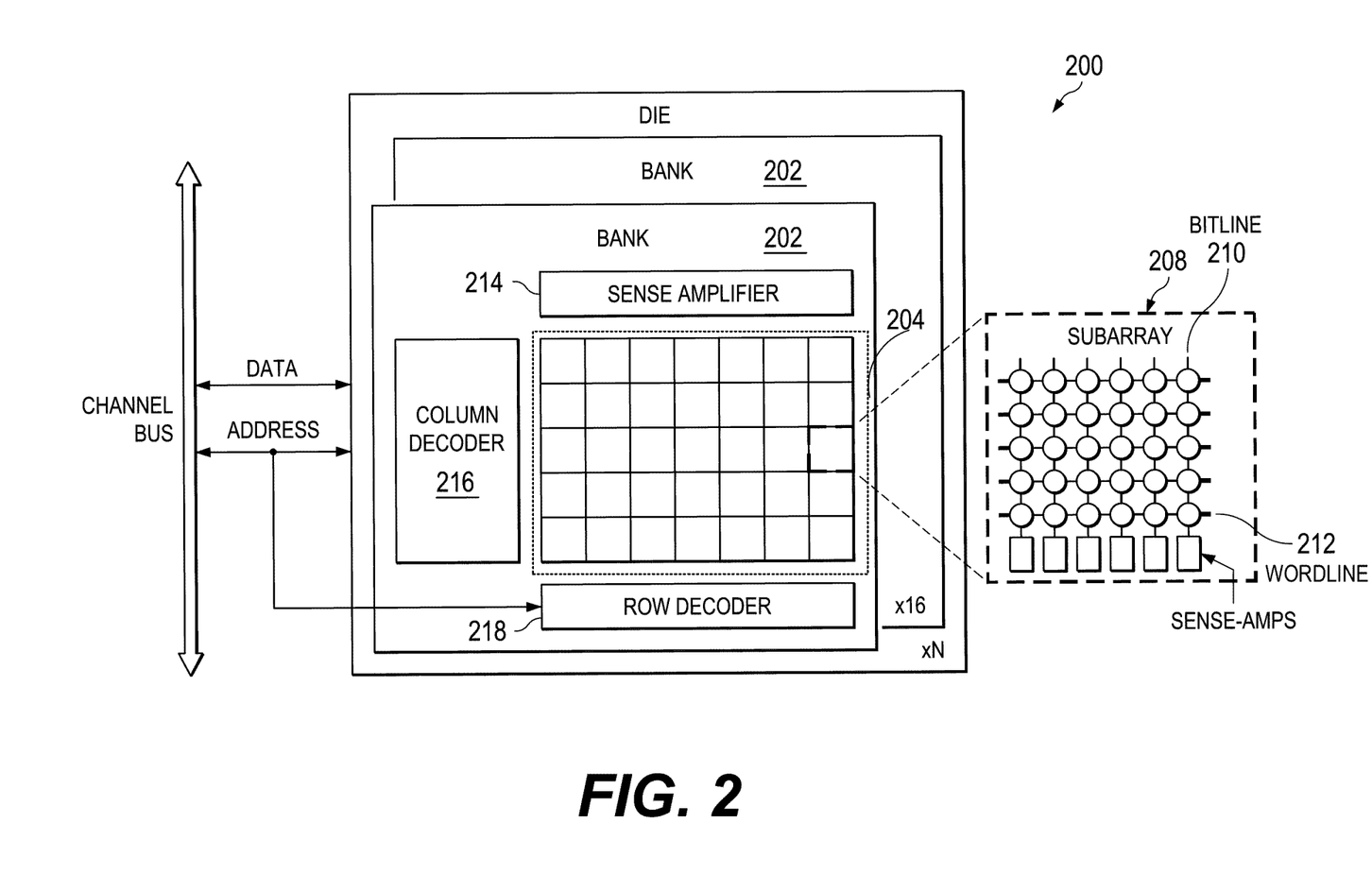
FIG. 2 shows an example of a PCM device 200 according to an embodiment of the disclosure.

FIG. 2 shows an example of a PCM device 200 according to an embodiment of the disclosure. The PCM device 200 may communicate with the memory controller (for example the memory controller 106 in FIG. 1) via a channel bus. Data and addresses may be transmitted between PCM device 200 and the memory controller. The PCM device 200 includes a die comprising a set of memory banks 202. Each memory bank 202 includes a memory array 204 (also referred to as a memory cell array) having memory cells arranged in rows and columns. The memory array 204 may be divided into a number of memory sub-arrays 208 for efficient wiring and low power consumption. In some embodiments, each or at least one of the memory cells includes a PCM cell. The PCM cell may be programmed to either a set state or a reset state to store data as described above. Each memory cell is connected to a bit line 210 and a word line 212. Each memory bank 202 includes a data buffer/sense amplifier 214, a column decoder/bit line driver 216, and a row decoder/word line driver 218. In some examples, additional peripheral circuits (not shown in FIG. 2) may be included as well.

Data buffer/sense amplifier 214 can be configured to read and program (write) data from and to memory cell array 204 according to control signals from a memory controller (e.g., the memory controller 106 of FIG. 1). In one example, data buffer/sense amplifier 214 may store one codeword of program data (write data) to be programmed into memory cell array 204. In another example, data buffer/sense amplifier 214 may perform program verify operations to ensure that the data has been properly programmed into selected memory cells coupled to selected word lines 212. In yet another example, data buffer/sense amplifier 214 may also sense the low power signals from bit line 210 that represents a data bit stored in a memory cell and amplify the small voltage swing to recognizable logic levels in a read operation.

Column decoder/bit line driver 216 may be connected to the memory cell array 204 via bit lines and select/drive one or more bit lines to perform an operation on the memory cell coupled to a selected bit line. Row decoder/word line driver 218 may be connected to the memory cell array 204 via word lines and select/drive one or more word lines to perform an operation on the memory cell coupled to a selected word line.

Figure 3:
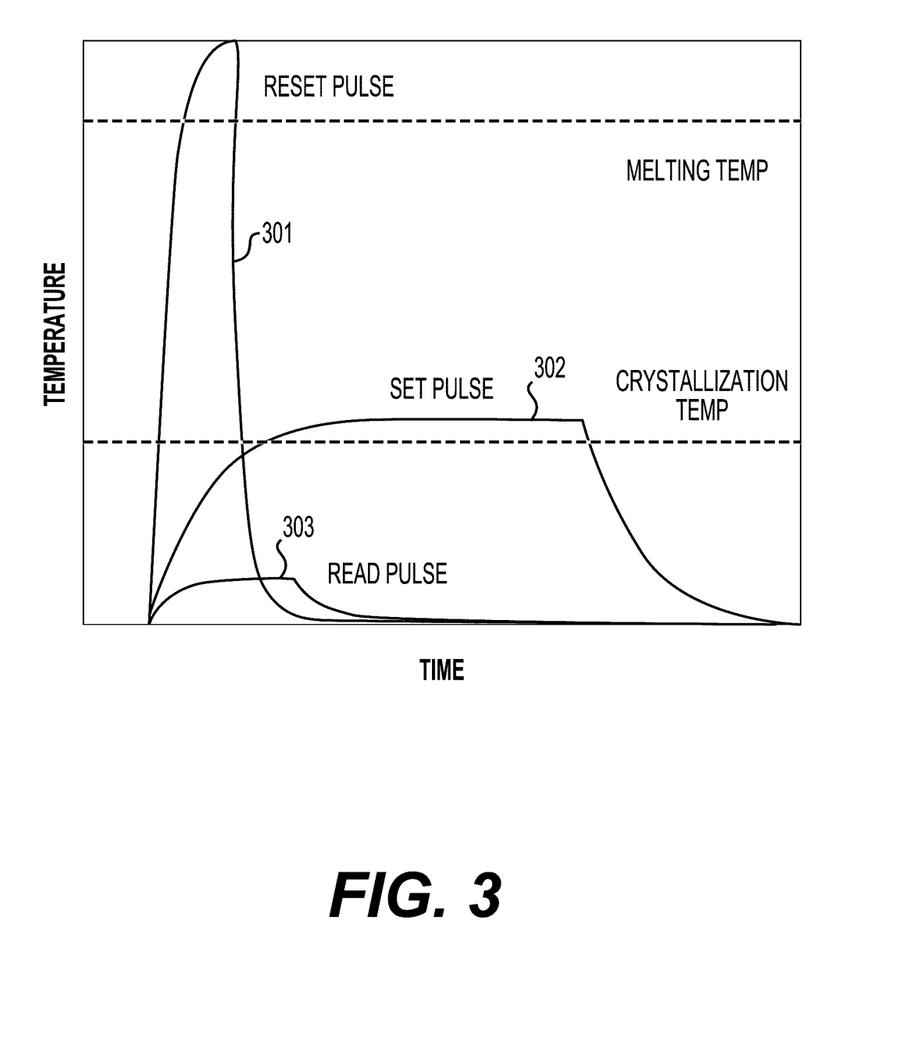
FIG. 3 shows temperature curves 301-303 of reset, set, and read operations in a PCM cell.

FIG. 3 shows temperature curves 301-303 of reset, set, and read operations in a PCM cell. For example, the PCM cell is used to store information based on the large resistivity contrast between the high-resistance amorphous state and low-resistance amorphous state of a phase change material. The PCM cell can be programmed (set or reset) and read using electrical pulses. The electrical pulses can generate Joule heat to induce phase transformation in the phase-change material during the reset or set operation.

To reset the PCM cell into the amorphous phase, a large electrical current pulse can be applied to a programming region for a short time (e.g., 50 ns or less). The programming region can be first melted and then quenched rapidly. The temperature curve 301 corresponds to this reset operation. As shown, the peak portion of the temperature curve 301 is above the melting temperature. This high temperature can have a negative effect on the endurance of the PCM cell. In an example, frequently applying the high temperature may change the property of the phase change material, reducing or eliminating the resistivity contrast between the amorphous state and the crystalline state.

To set the PCM cell into the crystalline phase, a medium electrical current pulse can be applied for a longer time compared with the reset operation to anneal the programming region. The temperature curve 302 corresponds to this set operation. As shown, the respective temperature can be above the crystalline temperature and below the melting temperature. Compared with the reset operation, the operating temperature in the set operation is lower and thus may have a less negative effect on the endurance of the PCM cell. Also, the power consumption in the set operation can be less than that in the reset operation. The data pattern transformation technologies disclosed herein can reduce the number of reset operations in the programming operation of PCM-based memory devices. Thus, data pattern conversion technologies have the advantages of improving the endurance of the respective memory devices and saving power.

To read the state of the PCM cell, a small electrical bias is applied to measure the resistance without disturbing the phase change material in the programming region. The temperature Curve 303 corresponds to this read operation.

Figure 4:
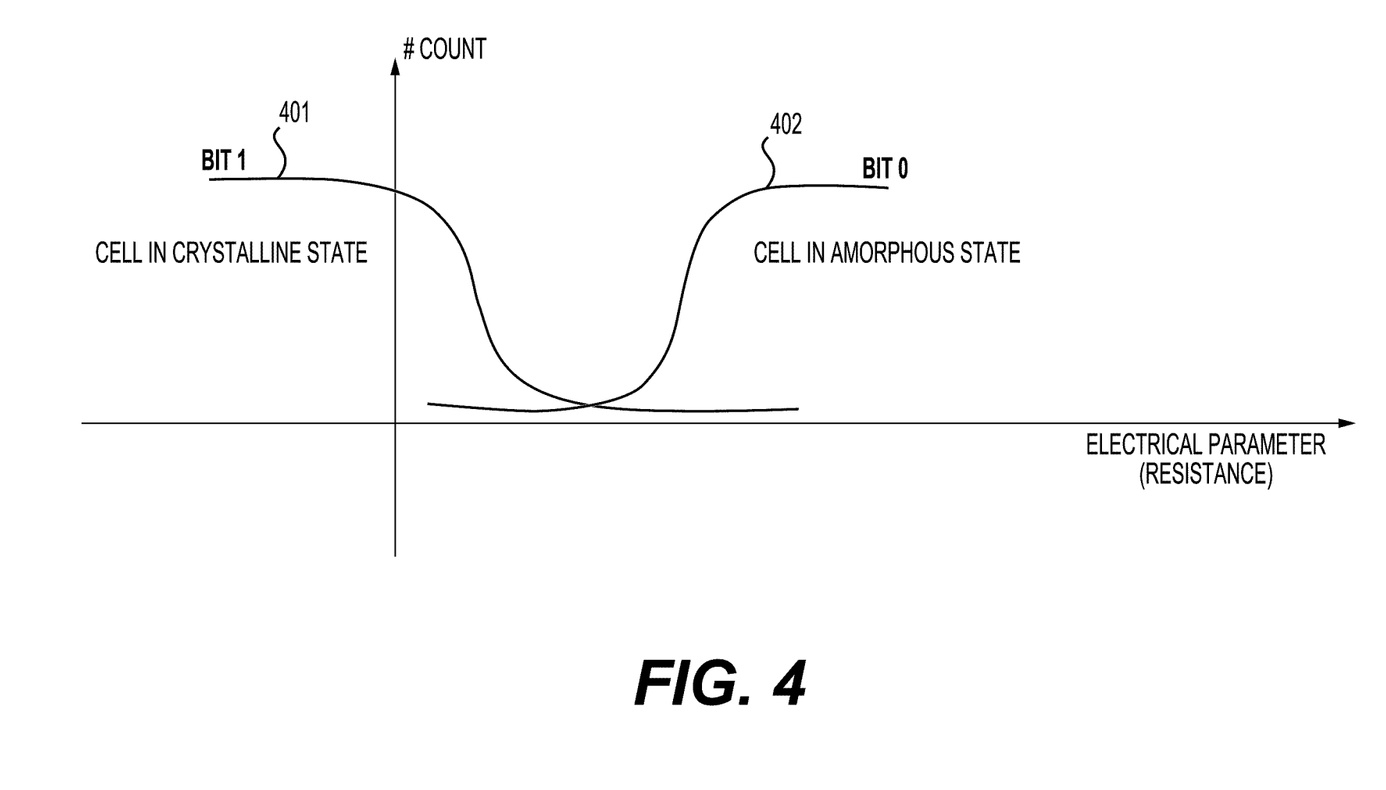
FIG. 4 shows a schematic diagram of storage information distributions of memory cells according to embodiments of the disclosure.

FIG. 4 shows a schematic diagram of storage information distributions of memory cells according to embodiments of the disclosure. The horizontal axis represents electrical parameter values (such as resistance values) of the memory states of the respective memory cells. The vertical axis represents the numbers of the memory cells corresponding to different electrical parameter values. The memory cells can belong to memory devices 104 that are based on various memory technologies. For example, the memory cells can belong to memory devices of SCM.

The memory cells can have at least two memory states corresponding to bit 1 and bit 0, as shown in FIG. 4. The distribution 401 represents the storage information distribution of the memory cells in the memory state of bit 1. The distribution 402 represents storage information distribution of the memory cells in the memory state of bit 0. In average, the memory cells in the memory state of bit 0 have a larger electrical parameter value than those in the memory state of bit 1. A portion of the memory cells of bit 0 has smaller electrical parameter values than a portion of the memory cells of bit 1.

Figure 5A:
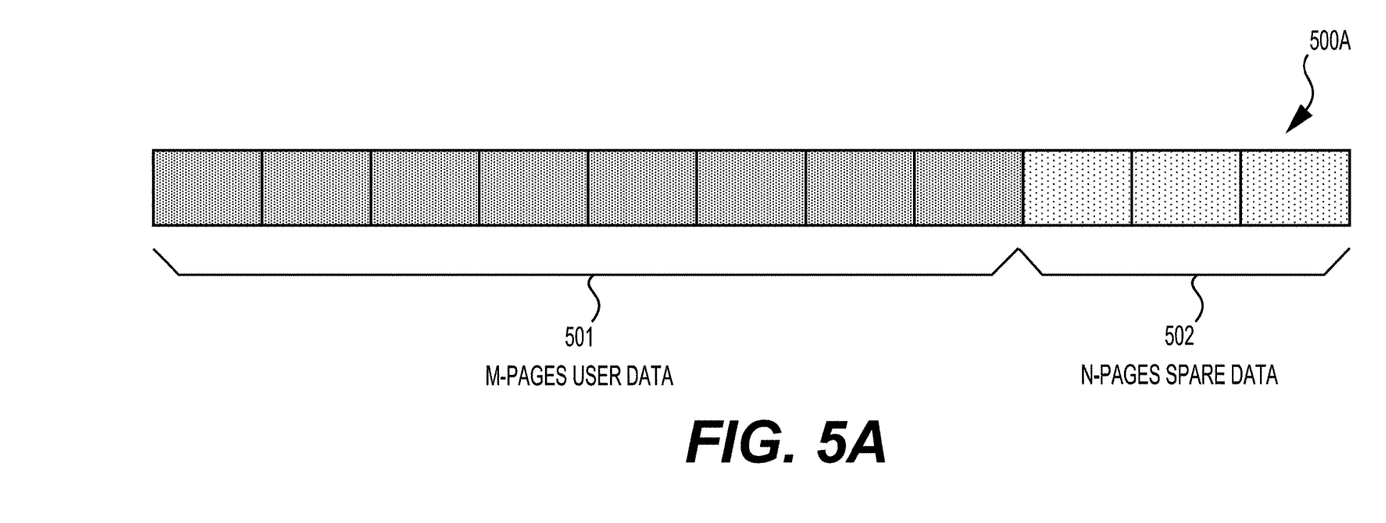
FIG. 5A shows a schematic diagram of a codeword 500A according to an embodiment of the disclosure.

FIG. 5A shows a schematic diagram of a codeword 500A according to an embodiment of the disclosure. The codeword 500A includes a first portion, user data 501 of M pages, and a second portion, spare data 502 of N pages. The codeword 500A can result from a data processing process. For example, in the FIG. 1 example, the memory controller 106 can receive data from the host 108 that is to be written to memory devices 104. The memory controller 106 can then process the data before a program operation. Various processing operations may be performed for various purposes in the data processing process. For example, an error correction code (ECC) encoding process may be performed to generate ECC parity information. For example, a compression process may be performed to compress the data. For example, the data may be reshaped to another form to reduce read latency. For example, the data may be remapped to specific storage regions for the purpose of war leveling. For example, a cyclic redundancy check (CRC) code may be generated for error detection.

The data received from the host 108 can be part of the M-page user data 501. Or, a transformed copy of the received data can be part of the M-page user data. Information related to or resulting from the above-mentioned various processing operations may be generated and included in the N-page spare data 502. The M-page user data 501 and the N-page spare data 502 are associated with each other and written into memory devices 104. During a reading process, the memory controller 106 can process the user data 501 based on the spare data 502 to output the data in the original form.

Figure 5B:
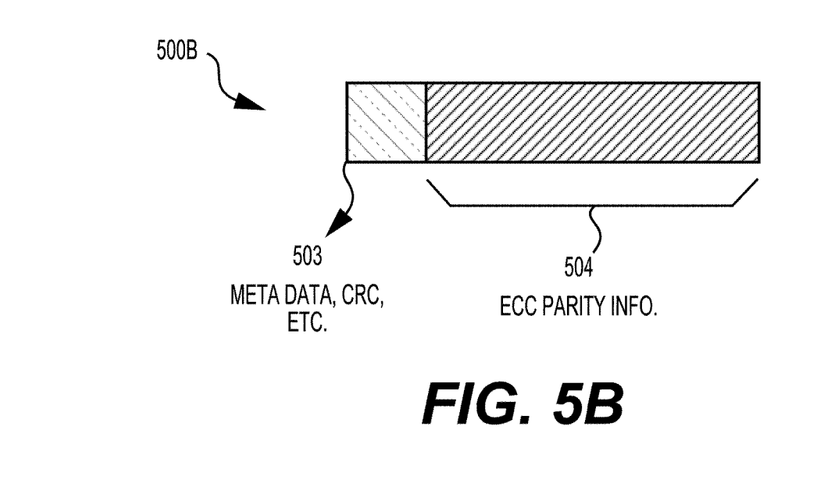
FIG. 5B shows an example of a layout of the spare data 502 according to embodiments of the disclosure.

FIG. 5B shows an example of a layout of the spare data 502 according to embodiments of the disclosure. The spare data 502 can include ECC parity information 504. The remaining portion of the spare data 502 can be used for storing various meta data, CRC, and the like.

In some embodiments, the data conversion schemes disclosed herein are used for processing the data to be programmed to memory devices 104 in FIG. 1 or memory device 200 in FIG. 2. For example, when the number of 0-bits is larger than the number of 1-bits in the received data, the memory controller 106 can flip the bits in the data. When the number of 0-bits is not larger than the number of 1-bits in the received data, or the number of 0-bits is larger than the number of 1-bits but the difference is not larger than a threshold, the memory controller 106 can determine that no flipping operation is performed. A flip flag can accordingly be generated to indicate whether a flipping operation is performed on the data.

In some embodiments, the memory controller 106 can flip the bits in the data when the number of 0-bits is larger than the number of 1-bits in the received data by a difference larger than a threshold. A flip flag can accordingly be generated to indicate a flipping operation is performed on the data.

In the above embodiments, the data to be programmed to memory devices 104 can be part of the user data 501, either in the original or converted form, depending on whether the flipping operation has been performed. The flip flag can be part of the spare data 502. During a read operation, the memory controller 106 can effectively determine whether to perform a flipping operation to recover the data or skip the filling operation based on the flip flag obtained from the spare data 502.

Figure 6:
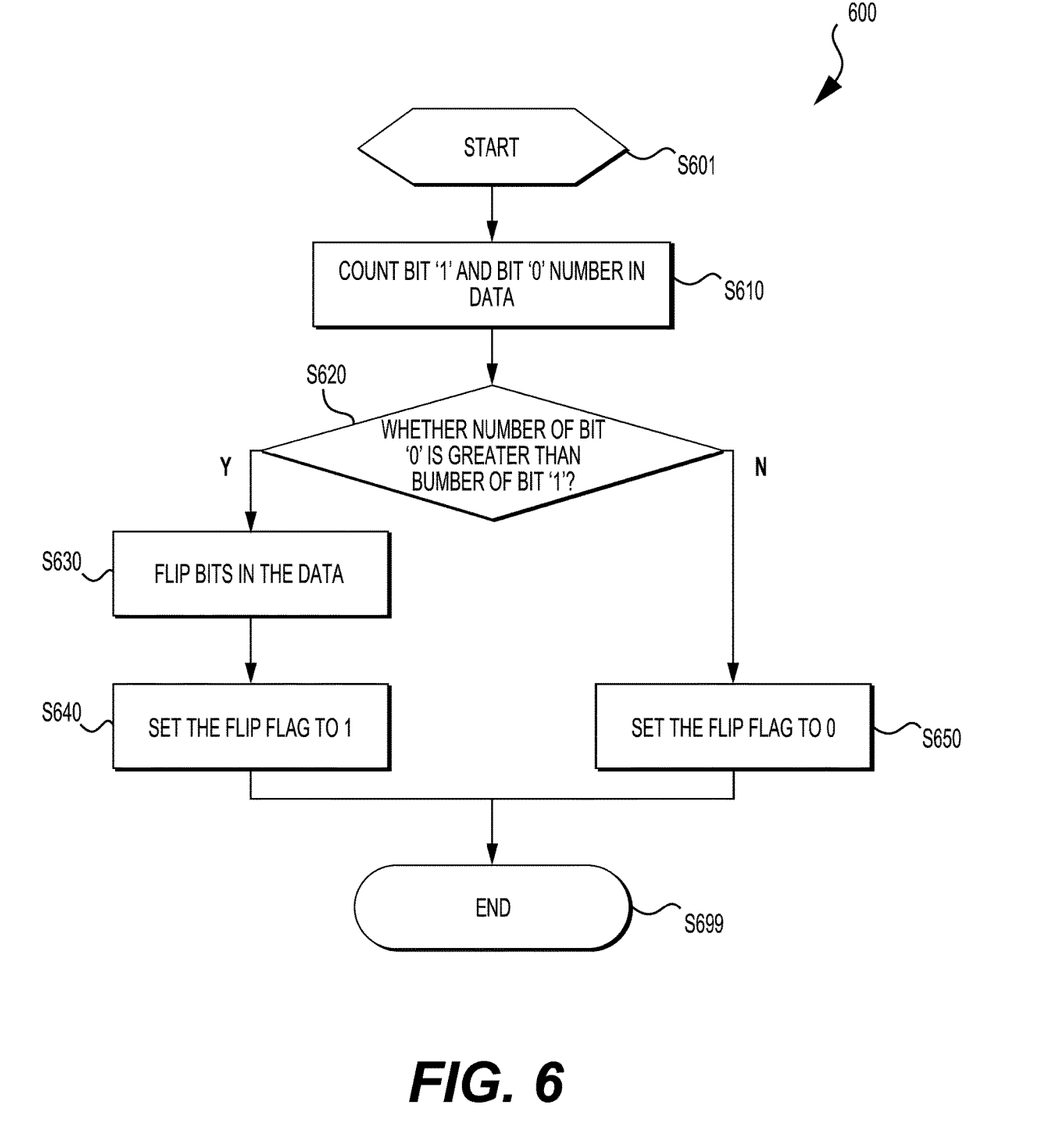
FIG. 6 shows a flowchart of a data processing process 600 according to embodiments of the disclosure.

FIG. 6 shows a flowchart of a data processing process 600 according to embodiments of the disclosure. The process 600 can be performed by the memory controller 106 in memory system 102 in the FIG. 1 example. The process 600 can start from S601 and proceed to S610.

At S610, the numbers of 1-bits and 0-bits in to-be-stored data are counted. For example, the memory controller 106 can receive original data from the host 108. The memory controller 106 can count the number of digits of 1s and the number of digits of 0s in the original data. For example, the memory controller 106 may be configured with a counter. The counter can be implemented with suitable hardware, software (firmware), or a combination thereof. In an example, instead of counting the bits in the original data from the host 108, the memory controller 106 can count the bits in data resulting from a prior processing operation. For example, the original data is transformed (e.g., reshaped, compressed, and the like) to another form. The data conversion process 600 can be performed on the transformed data.

At S620, it is determined whether the number of 0-bits is greater than the number of 1-bits based on the results of S610. When the number of 0-bits is greater than the number of 1-bits, the process 600 proceeds to S630. Otherwise, the process 600 proceeds to S650.

In some embodiments, at S620, a predefined threshold is used to control the flow of the process 600. Specifically, it is determined whether the number of 0-bits is greater than the number of 1-bits and the difference between the number of 0-bits and the number of 1-bits is larger than a threshold. If so, the process 600 proceeds to S630. Otherwise, the process 600 proceeds to S650. For example, the bit flipping operation may cause delay and increase power consumption. If the difference between the number of 0-bits and the number of 1-bits is smaller than the threshold, the benefit of inverting the bits may not be worth the cost of the bit flipping operation. Accordingly, performing the flipping operation can be skipped.

At S630, the bits in the data can be flipped. In some embodiments, all bits in the data can be flipped. In some embodiments, a portion of the bits is flipped. For example, the bits at specific positions in the data are flipped. The resulting data can be included in the user data. In an embodiment, the user data can then go through an ECC process by an ECC encoder to generate ECC parity information. The ECC parity information can be included in the spare data. The user data and spare data can later be stored in memory devices 104. In some embodiments, the memory controller 106 can be configured with an inverter to perform the flipping operation. The inverter can be implemented with suitable hardware, software (firmware), or a combination thereof.

At S640, a flip flag is set. For example, the flip flag uses one bit to indicate that the flipping operation has been performed. In an example, the value of the flip flag is set to 1 to indicate that the flipping operation has been performed. The flip flag can be included in the spare data and stored in memory devices 104. The process 600 can proceed to S699 and terminate at S699.

At S650, a flip flag is set. For example, the flip flag uses one bit to indicate that the flipping operation has not been performed. In an example, the value of the flip flag is set to 0 to indicate that the flipping operation has not been performed. Similarly, the flip flag can be included in the spare data and stored in memory devices 104. The process 600 can proceed to S699 and terminate at S699. In some examples, a flip flag uses the bit 0 to indicate that a flipping operation has been performed and the bit 1 to indicate that a flipping operation is not performed.

Figure 7:
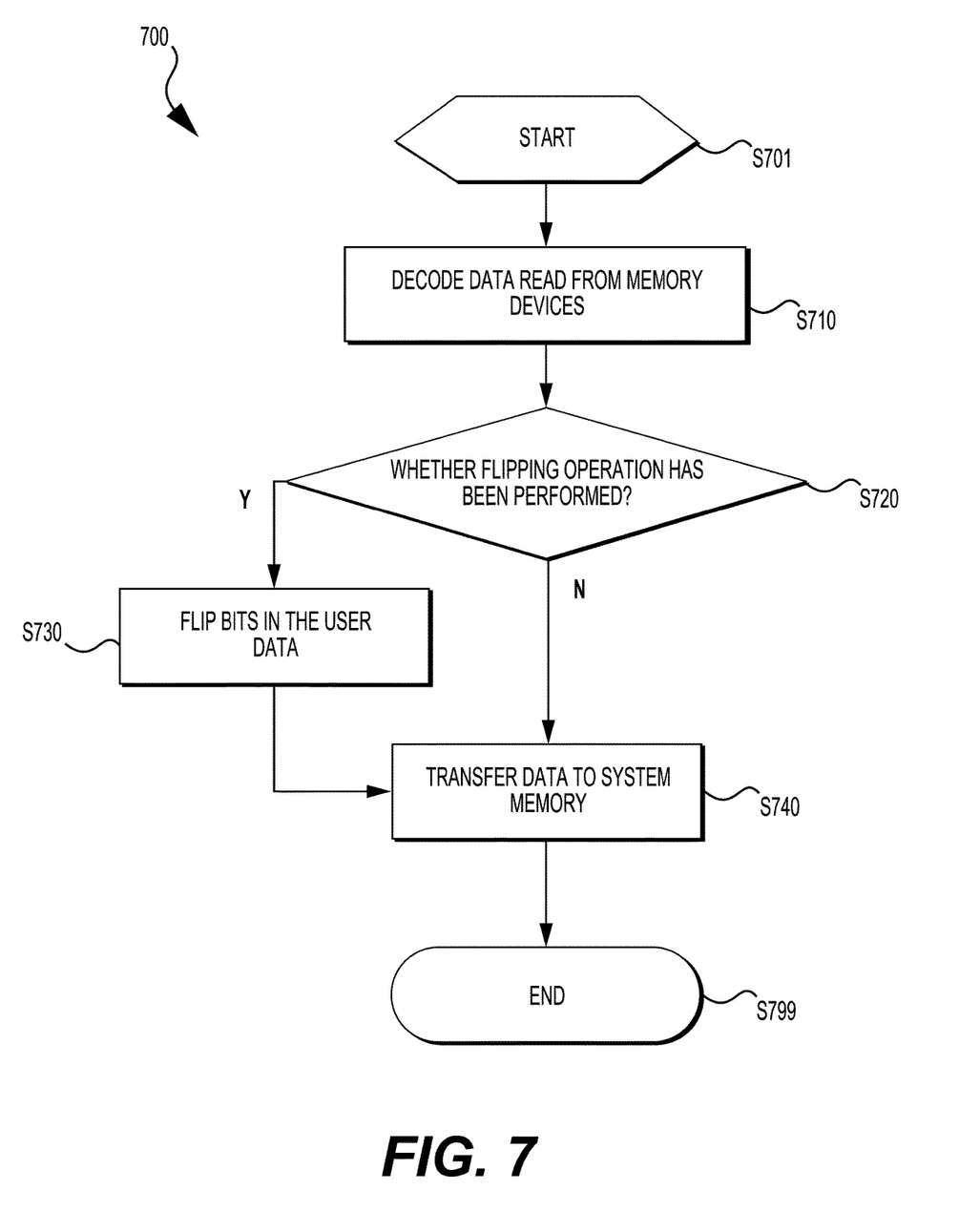
FIG. 7 shows another flowchart of a data processing process 700 according to embodiments of the disclosure.

FIG. 7 shows another flowchart of a data processing process 700 according to embodiments of the disclosure. The process 700 can be performed by the memory controller 106 in memory system 102 in the FIG. 1 example. The process 700 can start from S701 and proceed to S710.

At S710, data read from memory devices 104 can be decoded successfully by performing an ECC decoding process by an ECC decoder. For example, a codeword (such as the codeword 500A) can be read from memory device 104. The codeword can include user data portion and spare data portion. The spare data can include ECC parity information. The ECC decoder can recover the user data based on the ECC parity information and the user data.

At S720, whether a flipping operation has been performed on the user data can be determined based on a value of a flip flag. For example, the flip flag can be part of the spare data obtained at S710. In some embodiments, if the flip flag has a bit value of 1, it can be determined that a flipping operation has been performed. If the flip flag has a bit value of 0, it can be determined that a flipping operation has not been performed. When the flipping operation has been performed, the process 700 proceeds to S730. Otherwise, the process 700 proceeds to S740.

At S730, the bits in the recovered user data obtained at S710 can be flipped at an inverter to obtain inverted data. In case the inverted data is the original data received from the host 108, the inverted data can be transferred to the host 108. In case the inverted data is in a form transformed from the original data, further operations (e.g., decompression, inverse operation of prior reshape operation, and the like) can be performed to obtain the original data received from the host 108.

At S740, the original data obtained at S730 or included in the user data at S710 can be transferred to a system memory (e.g., a read buffer) of the host 108. The process 700 can proceed to S799 and terminate at S799.

A memory controller in a memory system can be configured to perform various functions in accordance with one or more embodiments or examples described herein. The memory controller can include a general-purpose processor or specially designed circuits to implement various functions, components, or processes described herein in various embodiments. For example, the memory controller can include processing circuitry configured to perform the functions and processes described herein in combination with software or without software. In various examples, the processing circuitry can be a digital signal processor (DSP), an application-specific integrated circuit (ASIC), programmable logic devices (PLDs), field programmable gate arrays (FPGAs), digitally enhanced circuits, or comparable device or a combination thereof.

In some other examples, the processing circuitry can be a central processing unit (CPU) configured to execute program instructions to perform various functions and processes described herein. For example, the memory controller can include a memory configured to store program instructions. The processing circuitry, when executing the program instructions, can perform the functions and processes. The memory can further store other programs or data, such as operating systems, application programs, and the like. The memory can include non-transitory storage media, such as a read-only memory (ROM), a random-access memory (RAM), a flash memory, a solid-state memory, and the like.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer-readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random-access memory (RAM), a read-only memory (ROM), a magnetic disk and an optical disk, and the like. The computer-readable non-transitory storage medium can include all types of computer-readable medium, including magnetic storage medium, optical storage medium, flash medium, and solid-state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for a memory system comprising a memory device, the method comprising:
   receiving data that is to be written into the memory device, the memory device including memory cells, each memory cell having a first state and a second state, the data including bits each corresponding to one of the first state and the second state;
   counting a first bit number of the bits corresponding to the first state and a second bit number of the bits corresponding to the second state in the received data;
   in response to the second bit number of the bits corresponding to the second state being larger than the first bit number of the bits corresponding to the first state, performing a first flipping operation to flip the bits in the received data; and
   storing the received data with the flipped bits to the memory device.

2. The method of claim 1, further comprising:
   performing the first flipping operation to flip the bits in the received data in response to the second bit number of the bits corresponding to the second state being larger than the first bit number of the bits corresponding to the first state by a difference that is greater than a threshold.

3. The method of claim 1, further comprising:
   storing the received data to the memory device without flipping the bits in the received data in response to
      the second bit number of the bits corresponding to the second state being not larger than the first bit number of the bits corresponding to the first state, or
      the second bit number of the bits corresponding to the second state being larger than the first bit number of the bits corresponding to the first state by a difference that is smaller than a threshold.

4. The method of claim 1, further comprising:
   generating a flipping flag indicating whether the first flipping operation has been performed to the received data; and
   storing the flipping flag to the memory device.

5. The method of claim 4, further comprising:
   reading, from the memory device, the received data with the flipped bits and the flipping flag indicating whether the first flipping operation has been performed to the received data;
   determining whether to perform a second flipping operation to the received data with the flipped bits based on the flipping flag indicating whether the first flipping operation has been performed to the received data; and
   in response to the flipping flag indicating that the first flipping operation has been performed to the received data, performing the second flipping operation to flip the previously flipped bits in the received data.

6. The method of claim 5, wherein the storing the received data with the flipped bits to the memory device includes:
   encoding the received data with the flipped bits to generate error correction code (ECC) parity information; and
   storing the ECC parity information to the memory device.

7. The method of claim 6, wherein the reading, from the memory device, the received data with the flipped bits includes:
   reading the ECC parity information from the memory device; and
   recovering the received data with the flipped bits based on the ECC parity information.

8. The method of claim 1, wherein the memory device is a phase change memory (PCM) device, and the first state and the second state of the memory cells of the memory device correspond to a crystalline state and an amorphous state, respectively, of the PCM device.

9. A memory system, comprising:
   a memory device comprising memory cells, and
   a memory controller comprising circuitry configured to:
      receive data that is to be written into the memory device, each memory cell having a first state and a second state, the data including bits each corresponding to one of the first state and the second state;
      count a first bit number of the bits corresponding to the first state and a second bit number of the bits corresponding to the second state in the received data;
      in response to the second bit number of the bits corresponding to the second state being larger than the first bit number of the bits corresponding to the first state, perform a first flipping operation to flip the bits in the received data; and
      store the received data with the flipped bits to the memory device.

10. The memory system of claim 9, wherein the circuitry is further configured to:
    perform the first flipping operation to flip the bits in the received data in response to the second bit number of the bits corresponding to the second state being larger than the first bit number of the bits corresponding to the first state by a difference that is greater than a threshold.

11. The memory system of claim 9, wherein the circuitry is further configured to:
    store the received data to the memory device without flipping the bits in the received data in response to
       the second bit number of the bits corresponding to the second state being not larger than the first bit number of the bits corresponding to the first state, or
       the second bit number of the bits corresponding to the second state being larger than the first bit number of the bits corresponding to the first state by a difference that is smaller than a threshold.

12. The memory system of claim 9, wherein the circuitry is further configured to:
generate a flipping flag indicating whether the first flipping operation has been performed to the received data; and
store the flipping flag to the memory device.

13. The memory system of claim 12, wherein the circuitry is further configured to:
read, from the memory device, the received data with the flipped bits and the flipping flag indicating whether the first flipping operation has been performed to the received data;
determine whether to perform a second flipping operation to the received data with the flipped bits based on the flipping flag indicating whether the first flipping operation has been performed to the received data; and
in response to the flipping flag indicating that the first flipping operation has been performed to the received data, perform the second flipping operation to flip the previously flipped bits in the received data.

14. The memory system of claim 13, wherein the circuitry is further configured to:
encode the received data with the flipped bits to generate error correction code (ECC) parity information; and
store the ECC parity information to the memory device.

15. The memory system of claim 14, wherein the circuitry is further configured to:
read the ECC parity information from the memory device; and
recover the received data with the flipped bits based on the ECC parity information.

16. The memory system of claim 9, wherein the memory device is a phase change memory (PCM) device, and the first state and the second state of the memory cells of the memory device correspond to a crystalline state and an amorphous state, respectively, of the PCM device.

17. A non-transitory computer-readable medium storing instructions that upon execution by a processing device cause the processing device to perform a method for a memory system, comprising:
receiving data that is to be written into a memory device of the memory system, the memory device including memory cells, each memory cell having a first state and a second state, the data including bits each corresponding to one of the first state and the second state;
counting a first bit number of the bits corresponding to the first state and a second bit number of the bits corresponding to the second state in the received data;
in response to the second bit number of the bits corresponding to the second state being larger than the first bit number of the bits corresponding to the first state, performing a first flipping operation to flip the bits in the received data; and
storing the received data with the flipped bits to the memory device.

18. The non-transitory computer-readable medium of claim 17, wherein the method further comprises:
storing the received data to the memory device without flipping the bits in the received data in response to
the second bit number of the bits corresponding to the second state being not larger than the first bit number of the bits corresponding to the first state, or
the second bit number of the bits corresponding to the second state being larger than the first bit number of the bits corresponding to the first state by a difference that is smaller than a threshold.

19. The non-transitory computer-readable medium of claim 17, wherein the method further comprises:
generating a flipping flag indicating whether the first flipping operation has been performed to the received data; and
storing the flipping flag to the memory device.

20. The non-transitory computer-readable medium of claim 19, wherein the method further comprises:
reading, from the memory device, the received data with the flipped bits and the flipping flag indicating whether the first flipping operation has been performed to the received data;
determining whether to perform a second flipping operation to the received data with the flipped bits based on the flipping flag indicating whether the first flipping operation has been performed to the received data; and
in response to the flipping flag indicating that the first flipping operation has been performed to the received data, performing the second flipping operation to flip the previously flipped bits in the received data.

* * * * *